US007703754B2

(12) United States Patent
Siemer et al.

(10) Patent No.: US 7,703,754 B2
(45) Date of Patent: Apr. 27, 2010

(54) LIMIT STOP FOR A DOOR OR LID OF A MOTOR VEHICLE

(75) Inventors: Hubert Siemer, Dinklage (DE); Burkhard Meyer, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/355,382

(22) Filed: Jan. 16, 2009

(65) Prior Publication Data

US 2009/0115116 A1 May 7, 2009

Related U.S. Application Data

(62) Division of application No. 11/343,748, filed on Jan. 31, 2006, now abandoned.

(30) Foreign Application Priority Data

Feb. 11, 2005 (DE) ...................... 10 2005 006 557

(51) Int. Cl.
*F16F 13/00* (2006.01)

(52) U.S. Cl. .................. 267/140.13; 267/116; 267/139; 267/153; 296/207; 16/86 R

(58) Field of Classification Search ................. 267/136, 267/140, 140.13, 140.11, 139, 116, 118, 267/151–153; 188/322.5, 378; 16/82, 85, 16/86 A, 86 R; 296/76, 207; 180/69.2
See application file for complete search history.

(56) References Cited

U.S. PATENT DOCUMENTS

| | | | | |
|---|---|---|---|---|
| 4,483,521 | A | | 11/1984 | Kakimoto |
| 4,630,808 | A | | 12/1986 | Ushijima et al. |
| 4,657,227 | A | | 4/1987 | Hofmann |
| 4,676,489 | A | | 6/1987 | Hofmann et al. |
| 4,700,931 | A | * | 10/1987 | Eberhard et al. .............. 267/35 |
| 4,858,879 | A | | 8/1989 | Miyamoto et al. |
| 4,924,549 | A | | 5/1990 | Morel et al. |
| 4,925,162 | A | | 5/1990 | Kojima |
| 5,651,535 | A | * | 7/1997 | David ...................... 267/140.5 |

(Continued)

FOREIGN PATENT DOCUMENTS

DE 19544064 A1 5/1996

(Continued)

*Primary Examiner*—Robert A Siconolfi
*Assistant Examiner*—Mariano Sy
(74) *Attorney, Agent, or Firm*—Norris McLaughlin & Marcus, PA; Christa Hildebrand, Esq.

(57) ABSTRACT

A limit stop with an elastomer resilient element, which is to be secured on a door or lid and/or on an opposing stationary vehicle section for damping forces generated when the door or lid strikes stationary chassis parts of a motor vehicle. The limit stop includes an additional damping section disposed adjacent to and cooperating with the elastic resilient element in a spring deflection direction of the resilient element. The damping section comprises at least two chambers filled with a fluid and a nozzle plate arranged between the chambers with at least one channel extending through the nozzle plate and connecting the chambers. The fluid is displaced from one of the chambers into the other chamber during a spring deflection of the elastomer resilient element, thereby producing a pressure force which is caused by the buildup in pressure when the volume of one of the chambers decreases and augments the return force of the resilient element.

13 Claims, 4 Drawing Sheets

U.S. PATENT DOCUMENTS

| | | | | | |
|---|---|---|---|---|---|
| 5,735,511 | A | * | 4/1998 | Stocker et al. | 267/140.13 |
| 5,806,908 | A | | 9/1998 | Kim | |
| 6,032,937 | A | | 3/2000 | Kojima et al. | |
| 6,039,388 | A | | 3/2000 | Choi | |

FOREIGN PATENT DOCUMENTS

| | | | |
|---|---|---|---|
| DE | 19743543 | A1 | 4/1999 |
| DE | 19929953 | A1 | 6/2000 |
| DE | 10035201 | A1 | 2/2002 |
| DE | 102004008046 | A1 | 3/2005 |
| EP | 604215 | A1 | 6/1994 |
| JP | 58174737 | A | 10/1983 |

* cited by examiner

LIMIT STOP FOR A DOOR OR LID OF A MOTOR VEHICLE

CROSS-REFERENCE TO RELATED APPLICATIONS

This application is a divisional application of U.S. patent application Ser. No. 11/343,748, filed Jan. 31, 2006, which is herein incorporated by reference in its entirety.

BACKGROUND OF THE INVENTION

1. Field of the Invention

The invention relates to a limit stop with an elastomer spring, for damping forces generated when a door or lid strike a stationary chassis part of a motor vehicle.

2. Description of the Related Art

To prevent clatter or damage to metal chassis parts or to the paint of motor vehicles, the area around the doors and lids, in particular the front hood and the trunk lid, typically includes means for damping the impact. In most situations, the impact from doors or lids closing on the respective chassis openings is dampened by a number of limit stops which are made of an elastomer material and arranged along the circumference of the opening. Suitable limit stops, frequently in the shape of the head of a mushroom, are used predominantly around the engine hood and the trunk lid, which close by their own weight through engagement with a snap-in lock. The limit stops operate as end stops for the respective closing height of the lid and absorb the acceleration forces generated by the closing lid.

The installation height for limit stops of this type should be selected so that the corresponding door or lid, when closed, is biased against that chassis so as to prevent rattle and leave only a very small gap spacing. A limit stop of this type is described, for example, in DE 199 29 953 A1. However, this document does not address the mechanical construction of the limit stop, but attempts to prevent accumulation of paint on limit stops which are already installed on the chassis when the vehicle is painted. In addition, DE 100 35 201 A1 describes a limit stop with a height which is adjustable in relation to the chassis frame. With the disclosed solution, manufacturing tolerances in the gap spacing of the lids or doors can be compensated. However, with the aforementioned conventional solutions, the spring characteristic of the buffers disadvantageously remains constant when the engine hood is closed, independent of the closing speed of the hood, so that the spring action is independent of the respective closing height of the hood. It would therefore be desirable to reduce peak forces exerted on the chassis parts, when the lid is accidentally and inadvertently dropped from a considerable height, by increasing the spring characteristic when the impact speed increases, and to also limit the depth with which the lid or door depresses the limit stop in view of the small gap spacing.

It is therefore an object of the invention to provide a limit stop with a spring characteristic which adapts within predefined limits to an increasing closing speed of a closing door or lid, and which also effectively dampens large impact forces. The limit stop should also make it possible to realize very small gap spacings.

SUMMARY OF THE INVENTION

The object is solved by a limit stop having the characteristic features recited in the independent claim. Advantageous embodiments and/or modifications of the solution of the invention are recited in the dependent claims. To dampen forces which are generated when a door or lid strikes a stationary chassis part of a motor vehicle, at least one limit stop configured according to the invention and including an elastomer resilient element is arranged on the door or lid and/or on an opposing vehicle part. Preferably, several of the limit stops are arranged along the interior edge of a frame opening, on which the door or lid is pivotally hinged.

Unlike conventional solutions, the limit stop of the invention includes an additional damping section which is disposed adjacent to and cooperates with the elastic resilient element in its spring deflection direction. The damping section includes at least two chambers filled with a fluid and a nozzle plate arranged between the two chambers with at least one channel extending through the nozzle plate and connecting the chambers. The fluid is displaced from one of the chambers into the other chamber during a spring deflection of the elastomer resilient element by building up pressure which adds to the return force of the resilient element.

According to an advantageous embodiment of the invention, the limit stop which is axially symmetric with respect to a longitudinal axis includes an elastomer spring and an inner core protruding into the spring. The inner core includes a stop face and an upper receiving body which receives the inner core and the spring which partially surrounds the inner core. The combination of stop face and upper receiving body forms a support body, which is assembled or connected as a single piece with a lower receiving body which receives the nozzle plate and an equalizing bellow. Chambers adapted to receive a viscous fluid are formed above and below the nozzle plate and connected by the channel in the nozzle plate. In a preferred embodiment of the invention, the viscous fluid can be ethylene glycol. The stop face of the inner core can be made of rubber or a thermoplastic elastomer.

According to a particularly advantageous embodiment of the invention, the height of the inner core, by which the inner core protrudes into the elastomer spring, is adjustable. Tolerances of the chassis parts can thereby be compensated and/or the gap spacing between the door or lid and the stationary chassis parts can be optimally adjusted. According to one practical embodiment, the height of the limit stop can be adjusted by constructing the inner core in form of a screw with a head made of an elastomer material, or covered or enclosed by an elastomer material. The height can be adjusted by screwing the screw, which protrudes into the elastomer resilient element, in or out of the elastomer resilient element.

According to advantageous another embodiment, which takes into consideration the desired long operating life of the limit stop, means for atomizing the viscous fluid, which enters the lower chamber under pressure through the nozzle, are arranged above the equalizing bellow. This arrangement prevents premature damage to the equalizing bellow from the fluid entering the lower chamber under high pressure. For example, a baffle, which can optionally be constructed as a single piece with the nozzle plate, can be arranged in the region of the inner wall of the equalizing bellow delimiting the chamber.

The nozzle formed by the channel of the nozzle plate has preferably the cross-section of a circular hole, but can also have a different cross-sectional shape. The limit stop can also include attachment means which can preferably be arranged along its outer circumference and can have different shapes depending on the intended installation site. For example, for attaching the limit stop to a chassis part, mounting lugs with through bores can be arranged on the outer circumference of the limit stop of the invention.

BRIEF DESCRIPTION OF THE DRAWINGS

Details of the invention will now be described with reference to exemplary embodiments.

DETAILED DESCRIPTION OF THE PRESENTLY PREFERRED EMBODIMENTS

Figure 1:
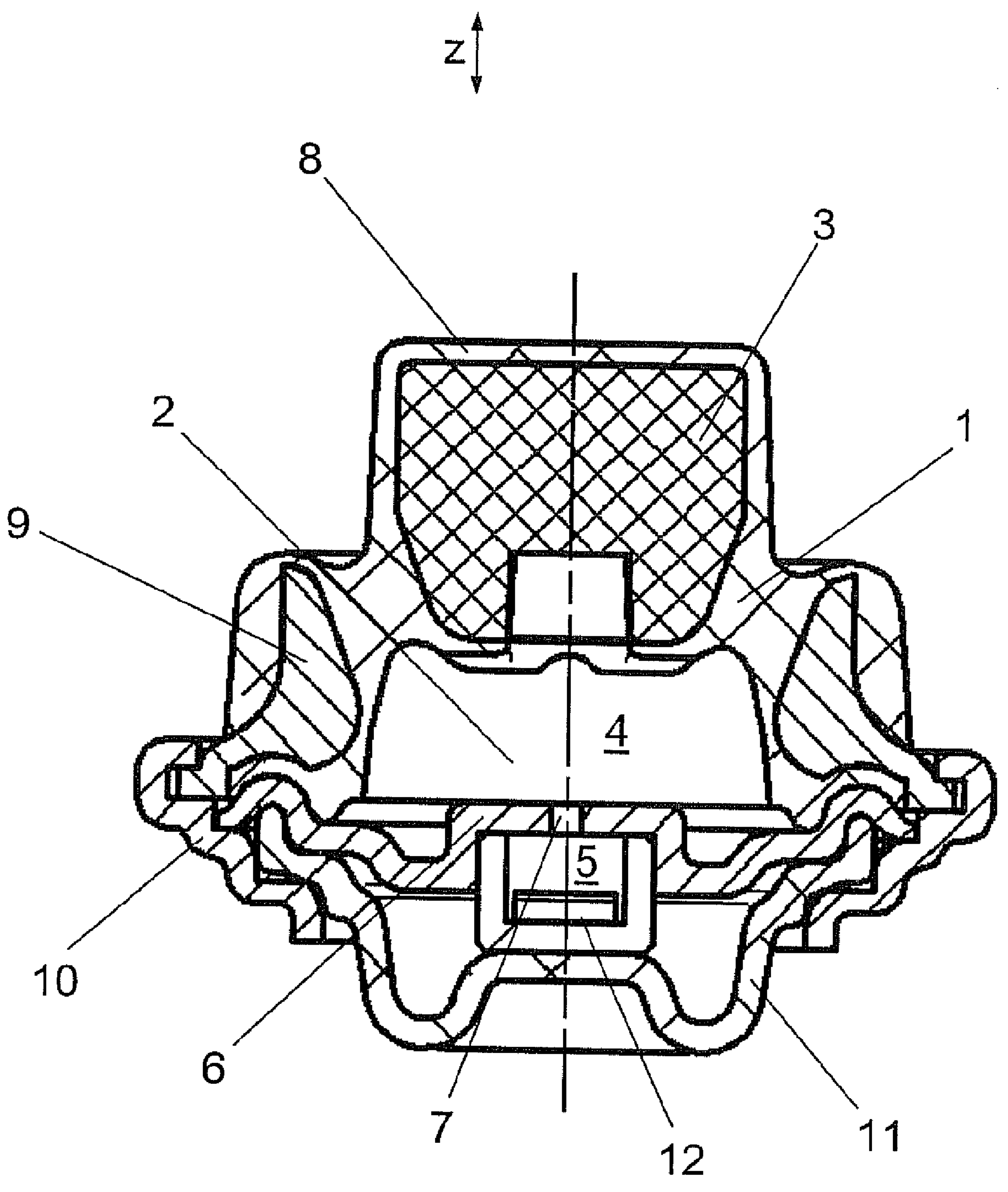
FIG. 1 shows an axial cross-sectional view of an embodiment of the limit stop.

The limit stop according to the invention for doors or lids is preferably arranged, as discussed previously, together with additional limit stops that have the same or a similar construction on the door or lid or a stationary chassis part. FIG. 1 shows an exemplary embodiment of the limit stop in an axial cross-section. In the following illustrations, in particular regarding the references "upper" or "top" and "lower" or "bottom", respectively, it will be assumed that the limit stop is installed as part of an impact damper for an engine hood, in a vertical orientation, referring to the longitudinal axis z of the limit stop, on stationary parts of the vehicle chassis, preferably in the frame opening of the engine hood.

An upper portion of the limit stop consists of an inner core 3, an elastomer spring 1, and the upper portion 9 of a receiving body 9, 10. The inner core 3 and the upper portion 9 of the receiving body 9, 10 are made of metal or plastic, wherein the top side of the inner core 3 is preferably made of rubber or covered with rubber. The inner core 3 protrudes into the elastomer spring 1 and is mostly surrounded by the spring 1, except for its upper section and the stop face 8 formed on the upper section. Both elements, i.e., the inner core 3 and the rubber spring 1, are received in the upper section 9 of the receiving body 9, 10 of the limit stop and together form a support body. The support body is connected with a bottom portion 10 of the receiving body 9, 10, which receives as essential elements an equalizing bellow 11 and a nozzle plate 6. In the illustrated example, the bottom portion 10 of the receiving body 9, 10 which can be made, for example, of metal, is connected with the upper portion 9 by a bead extending along the edge. The portions forming the receiving body 9, 10 can also be made of plastic and connected by a suitable joining process. A first chamber 4 filled with a viscous liquid is formed between the elastomer spring 1 and the nozzle plate 6. Another chamber 5 is located in the lower portion 10 of the receiving body 9, 10 below the novel plate 6 and above the equalizing bellow 11. A short channel 7 extending through the nozzle plate 6 enables fluid communication between both chambers 4, 5.

When the limit stop is installed for the intended application, a section of the aforementioned engine hood, which is typically closed by letting it drop, strikes the stop face 8 of the inner core 3 of the limit stop. The elastomer spring 1 of the stop, into which the inner core 3 protrudes, is compressed and generates a return force. This causes a decrease in the volume of the upper chamber 4 located below the elastomer spring 1. The decreasing volume of chamber 4 pressurizes the viscous fluid in the chamber 4, thereby generating a force that is superimposed on the return force of the elastomer spring 1. Some of the fluid is also displaced from the upper chamber 4, thus gradually reducing the pressure. The displaced fluid enters the lower chamber 5 through the channel 7 which has a small cross-section and is arranged in the nozzle plate 6. The viscous fluid which enters the lower chamber 5 at high pressure due to the small channel cross-section can damage the equalizing bellow 11. To protect the equalizing bellow 11, a baffle 12 or the like, which atomizes the fluid, is arranged above the equalizing bellow 11.

The channel 7, or the nozzle 7 formed by the channel, has preferably a cross-section formed as a circular hole, but can also have another cross-sectional shape, such as a square or conical ring gap. It will be understood that the impact energy can be optimally damped over a predetermined (drop) velocity range by adjusting in the limit stop the volume elasticity of the elastomer spring 1 and/or of the support body and the size of the channel cross-section in the nozzle plate 6. The hydraulic section 2 of the buffer, i.e., the chambers 4, 5 and the nozzle 7, cause an increase in the spring characteristic of the buffer with increasing impact speed. The throttle action of the channel 7 of the nozzle plate 9 almost completely converts the kinetic energy of the closing lid or door into dissipated energy. This approach effectively reduces the peak forces operating on the lid or door and the chassis and limits the travel of the lid or door under spring bias. This approach can also improve the chassis design, because of the gap spacing between the chassis parts can be further reduced. After the maximum spring travel has been reached, the elastomer spring 1 of the support body partially relaxes depending on the static load exerted by the lid or door. This reduces the pressure in the upper chamber 4 of the limit stop, so that the viscous fluid partially returns from the lower chamber 5 into the upper chamber 4. The final state of the system is reached when the lid or door are closed. Conversely, the limit stop completely rebounds when the door or lid is opened again.

Figure 2:
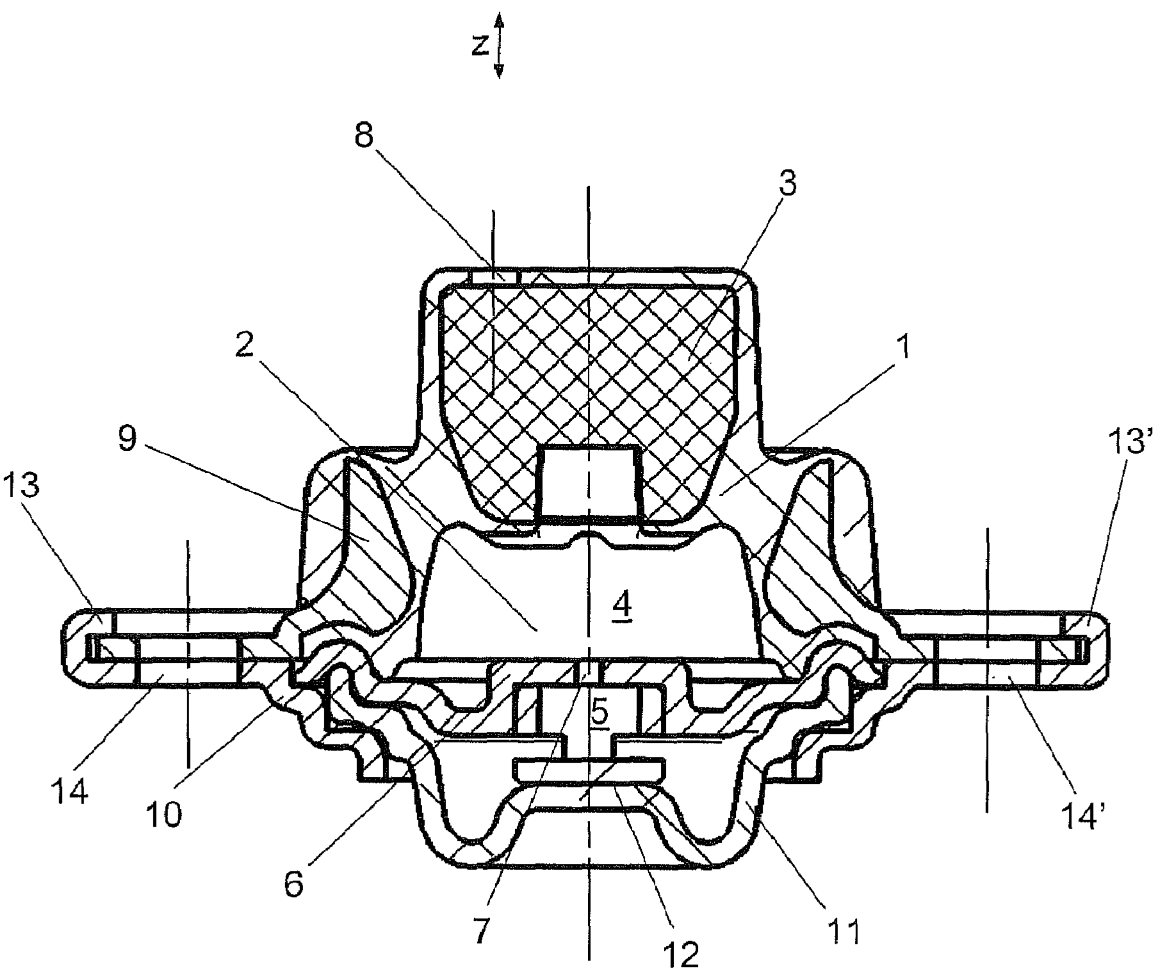
FIG. 2 shows the embodiment of FIG. 1, also as a longitudinal cross-sectional view, but rotated by 90°.

FIG. 2 shows the embodiment of FIG. 1 in a view rotated by 90°. As seen clearly, the nozzle plate 6 and the baffle 12 disposed in the lower chamber 5 on the top side of the equalizing bellow 11 form a single unit. FIG. 2 also shows lateral mounting lugs 13, 13' arranged on the outer circumference of the receiving body 9 of the limit stop with through bores 14, 14', which can be used to install the limit stop preferably along the edge of a door frame or a frame opening of a lid.

Figure 3:
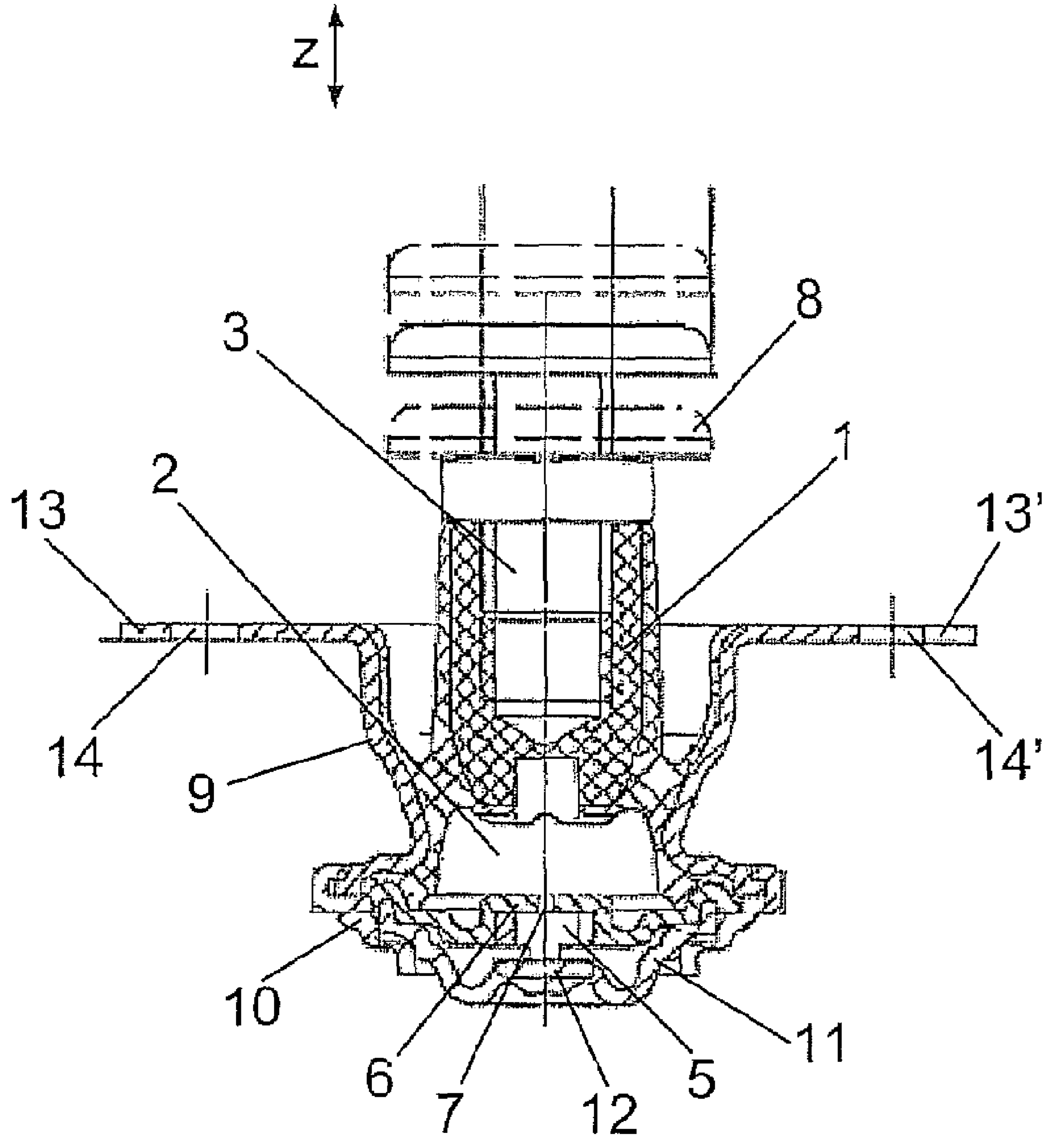
FIG. 3 shows a longitudinal cross-sectional view of another embodiment of the limit stop.
Figure 4:
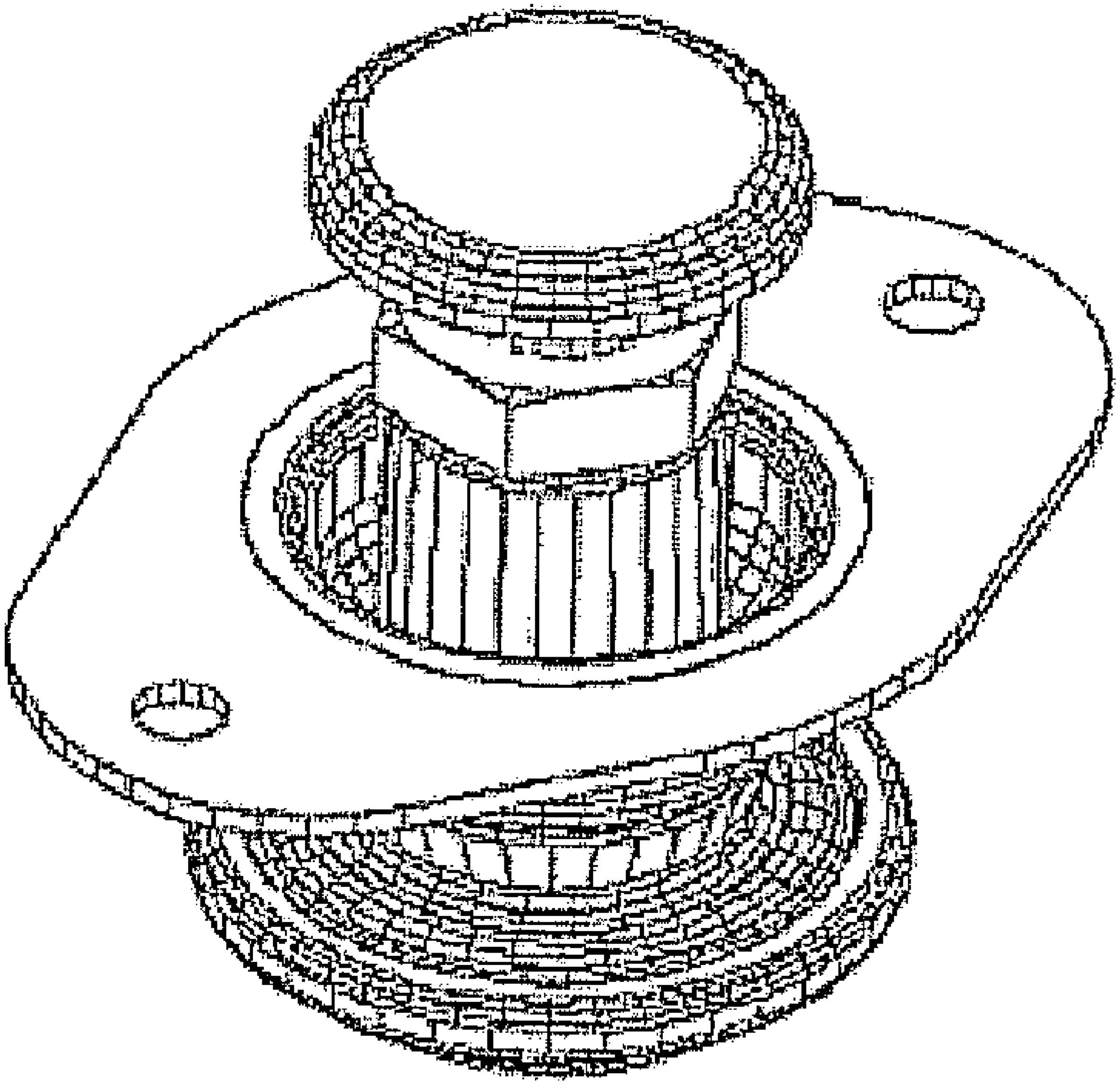
FIG. 4 shows an isometric view of the embodiment of FIG. 3.

FIG. 3 shows another embodiment of the limit stop, also in an axial cross-sectional view. In this embodiment, the inner core 3 of the limit stop is formed by a screw with a head that is covered with a layer of rubber or a thermoplastic elastomer. Tolerances of the chassis parts can be compensated and uniform gap dimensions can be attained by screwing the screw 3 in or out of the elastomer spring 1. FIG. 4 shows an isometric view of the embodiment illustrated in FIG. 3 with mounting lugs 13, 13' formed on the support body of the limit stop. Both the parts of the receiving body 9, 10 as well as the inner core 3 of the limit stop of the invention can be made of metal or plastic.

| List of reference symbols | |
|---|---|
| 1 | elastomer resilient element or elastomer spring |
| 2 | additional damping section (hydraulic section) |
| 3 | inner core |
| 4 | chamber |
| 5 | chamber |
| 6 | nozzle plate |
| 7 | channel or nozzle |
| 8 | stop surface |
| 9 | upper receiving body or upper section of the receiving body |
| 10 | lower receiving body or lower section of the receiving body |
| 11 | equalizing bellow |
| 12 | baffle |

-continued

| List of reference symbols | |
|---|---|
| 13, 13' | mounting lugs |
| 14, 14' | through bores |

What is claimed is:

1. A limit stop with an elastomer resilient element (1) to be secured on a door or lid and/or on an opposing stationary vehicle section for damping forces generated when the door or lid strikes stationary chassis parts of a motor vehicle, wherein the limit stop includes an additional damping section (2) disposed adjacent to and cooperating with the resilient element (1) in a spring deflection direction of the resilient element (1), wherein the damping section (2) comprises at least two chambers (4, 5) filled with a fluid and a nozzle plate (6) arranged between chambers (4, 5) with at least one channel extending through the nozzle plate and connecting the chambers (4, 5), wherein the fluid is displaced from one of the at least two chambers into the other of the at least two chamber during a spring deflection of the elastomer resilient element (1), thereby producing a pressure force which is caused by the buildup in pressure when the volume of one of the chambers (4) decreases and augments the return force of the resilient element (1), an inner core (3) protruding into the elastomer resilient element (1), but not protruding into any of the at least two chambers (4, 5), wherein a height of the inner core (3), by which it protrudes into the elastomer resilient element (1), is adjustable, so that tolerances of the chassis parts can be compensated and gap dimensions between the door or lid and the stationary chassis parts can be adjusted, a stop face (8) and an upper receiving body (9) which receives the inner core (3) and the elastomer resilient element (1) which partially surrounds the inner core (3), wherein the combination of stop face (8) and upper receiving body (9) form a support body, which is assembled or connected as a single piece with a lower receiving body (10) receiving the nozzle plate (6) and an equalizing bellow (11), wherein the chambers (4, 5) adapted to receive a viscous fluid are formed above and below the nozzle plate (6) and are connected by a channel (7) which operates as a nozzle.

2. The limit stop according to claim 1, wherein the limit stop is axially symmetric with respect to a longitudinal axis (z).

3. The limit stop according to claim 2, wherein the viscous fluid comprises ethylene glycol.

4. The limit stop according to claim 2, wherein the stop face (8) of the inner core (3) is made of rubber or a thermoplastic elastomer.

5. The limit stop according to claim 1, wherein the inner core (3) is formed as a screw with a head that is made of an elastomer material, or covered or enclosed by an elastomer material.

6. The limit stop according to claim 2, wherein a means (12) for atomizing the viscous fluid, which enters the lower chamber (5) through the nozzle (7) under pressure, are arranged above the equalizing bellow (11).

7. The limit stop according to claim 6, wherein a baffle (12) is provided for atomizing the viscous fluid, which enters the lower chamber (5) through the nozzle (7) under pressure.

8. The limit stop according to claim 6, wherein the means (12) for atomizing the viscous fluid entering the lower chamber are formed as a single piece with the nozzle plate (6).

9. The limit stop according to claim 1, wherein the only means (13, 13', 14, 14') for attaching the limit stop to a chassis part are arranged on an outer periphery of the limit stop.

10. The limit stop according to claim 9, wherein the attachment means comprise mounting lugs (13, 13') which include through bores (14, 14').

11. The limit stop according to claim 1, wherein the nozzle formed by the channel (7) of the nozzle plate (6) has a circular cross-section in form of a hole.

12. The limit stop according to claim 7, wherein the only structural component disposed in one of the at least two chambers (4, 5) is the baffle (12) and no structural component is disposed within the other of the at least two chambers (4, 5).

13. The limit stop according to claim 1, wherein the stop face and inner core are not secured to the motor vehicle so as to be compressible and generate the damping forces when the door or lid strikes the stationary chassis parts of the motor vehicle.

* * * * *